Jan. 18, 1944.  A. W. LEMMON  2,339,491
CONVEYER
Original Filed April 11, 1940
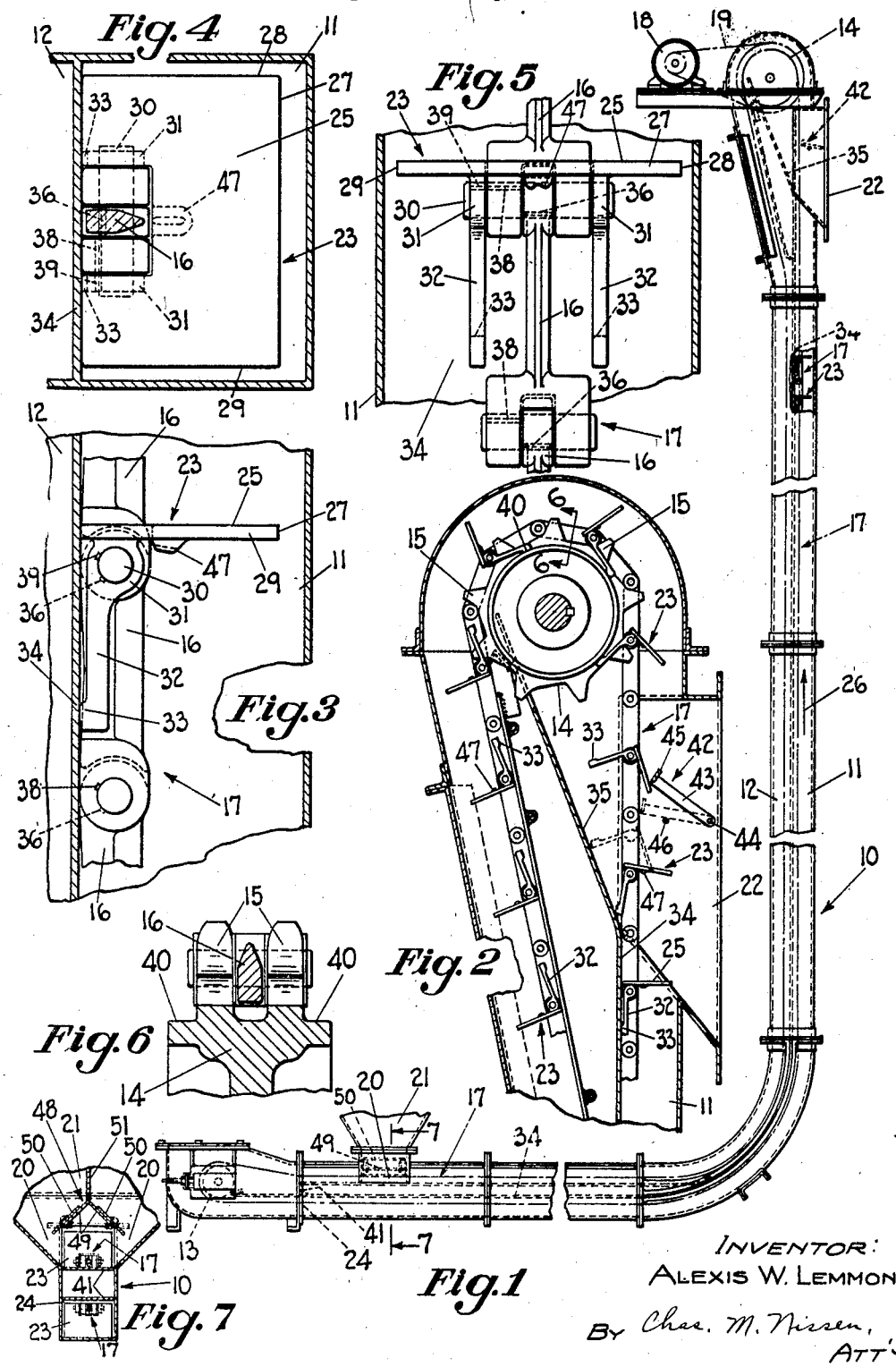
INVENTOR:
ALEXIS W. LEMMON,
By Chas. M. Nissen,
ATT'Y Patented Jan. 18, 1944

2,339,491

UNITED STATES PATENT OFFICE 2,339,491

CONVEYER

Alexis W. Lemmon, Columbus, Ohio, assignor to The Jeffrey Manufacturing Company, a corporation of Ohio Original application April 11, 1940, Serial No. 329,136. Divided and this application July 26, 1941, Serial No. 404,107

1 Claim. (Cl. 198—56)

This invention relates to a conveyer particularly of the scraper type, and in the preferred embodiment thereof which is disclosed the working leg of the conveyer is of the totally enclosed type.

One of the objects of the invention is the provision of means in a feed hopper for a conveyer, for relieving the conveyer of the weight of the material in the hopper.

More particularly it is the object of the present invention to provide a ridged roof in a feed hopper and adjustable mete means associated with the lower edges of the roof to control the flow of material in the hopper to a conveyer with which the hopper is associated.

Other objects of the invention will appear hereinafter, the novel features and combinations being set forth in the appended claim.

In the accompanying drawing,

Fig. 1 is a side elevational view with parts shown in section;

Fig. 2 is an enlarged sectional view showing mechanism for discharging the material at the discharge point;

Fig. 3 is an enlarged side view of one complete link of a conveyer chain and one of the conveyer flights, in a section of the working leg of the conveyer;

Fig. 4 is a plan view of one of the flights showing the chain in section and also the working leg of the conveyer;

Fig. 5 is a front view of one of the flights and a part of the conveyer chain and the working leg of the casing which is in section;

Fig. 6 is a sectional view of the drive sprocket taken on the line 6—6 of Fig. 2, looking in the direction of the arrows; and Fig. 7 is a sectional view on the line 7—7 of Fig. 1.

This application is a division of my co-pending application, Serial No. 329,136, filed April 11, 1940, for an improvement in a Conveyer.

Referring to the accompanying drawing, there is seen in Fig. 1 a totally enclosing casing or housing 10 formed by a working leg or tube 11 and a return leg or tube 12. The casing or housing 10 is generally L-shaped as illustrated in the drawing, but it is to be understood that it may take various shapes.

At the foot of the casing 10 there is an adjustable foot sprocket or wheel 13 and at the head thereof is a head sprocket 14 which is provided with a series of pair of spaced sprocket teeth 15 between which the links 16 of an endless conveyer chain 17 travel, said chain 17 forming a draft means of the conveying mechanism and extending between the sprockets 13 and 14.

The head sprocket 14 is driven from a motor 18 by chain and sprocket drive mechanism 19. Material is fed into the feed section of said casing or housing 10 by way of openings 20, 20 which permit material to be fed from hopper 21 laterally into the path of the conveying mechanism.

A ridged partition or roof 48 in the feed hopper protects the conveyer mechanism from the weight of the material in said hopper, thereby reducing the wear on the chain 17 and casing 10. To each sloping side 49 of ridged roof 48 is adjustably fixed a meting plate 50 adjustable to vary the size of the adjacent feed opening 20 to permit a predetermined variable amount of material to be fed laterally into the path of the conveying mechanism to each side thereof, as shown by referring to Fig. 7.

In the preferred embodiment, I construct the hopper 21 with a vertical partition 51 extending from the ridged roof 48 to the top of said hopper, and in conjunction with meting plates 50 permit different materials to be handled at the same time or at different times. That is, a different material in any desired proportions, may be fed to each side of said vertical partition 51. Of course, similar materials may be fed to both sides of said hopper, but when different materials are fed simultaneously into opposite sides of the hopper thorough mixture thereof may be obtained by the conveyance and discharge thereof from the discharge opening 22.

To provide simple means to convey material received at the foot end of said casing or housing 10 and discharge it to opening 22, which simple means also will insure a complete discharging of the material while effecting an efficient movement thereof through the working leg 11 of said casing 10, I provide flights 23 which preferably substantially fill the working leg 11 between the inlet opening 24 forming one extremity thereof and a discharge opening 22 forming the other extremity thereof. The flights 23 consequently act to convey material along the interior surface of the working leg 11 of the casing 10 with the forward or working face 25 supporting or pushing the material being conveyed as the chain 17 moves through the working leg 11 in the direction of the arrow 26 or, in other words, moves to convey material from the inlet opening 24 toward the discharge opening 22. For many materials the flights 23 need not be solid but may be perforated or generally open, but it is a desirable feature to have one or more peripheral edges such as one or more of the edges 27, 28 and 29 closely adjacent the interior surface of the working leg 11 so that the material being conveyed cannot freely pass between said peripheral edges 27, 28 or 29, or one or more of them and the adjacent interior surface of the working leg 11 of casing 10.

The flights 23 while moving in an upward direction, for example, as while moving through the upright portion of the working leg 11 will convey the material largely independently of the scraping action between the periphery thereof and the interior surface of said leg 11, but even here there is a certain amount of scraping conveying action by the cooperative action between the interior surface of said working leg 11 and the periphery of each flight 23. It is evident that in the construction illustrated the flights 23 would tend to swing to a non-conveying position under the influence of the material being conveyed unless mechanism were provided to prevent this.

During the travel of each flight 23 from the inlet opening 24 to the discharge opening 22, it is of course essential to maintain each flight 23 in a material conveying position, but it is desirable to permit it to swing to a non-conveying or material discharge position adjacent the discharge opening 22, and this action is provided by cooperating mechanism now to be described.

As clearly illustrated in Figs. 3, 4 and 5 of the drawing, the chain links 16 are pivotally attached together by pivot pins 30. Flights 23 are also pivoted on each pin 30 or alternate pins 30, as desired, as by means of a pair of bosses 31, 31 to which are attached trailing arms 32, 32 having sliding bearing surfaces 33, 33, which bearing surfaces 33, 33 are adapted to slide along stationary guide means 34 which maintain the working face 25 of each flight 23 substantially at right angles to the direction of travel of the chain 17 though said face may make either an acute or obtuse angle with respect thereto. In the preferred construction the guide means 34 is nothing more or less than a portion of the interior surface of the working leg of casing 10, but if desired wear strips may be added to form said guide means 34.

Adjacent the discharge opening 22, however, the guide means 34 are extended at 35 to provide for the swinging of the flights 23 to material discharging position adjacent said discharge opening 22. On the under side of working face 25 of flight 23 is formed an integral lug 47 which limits the downward swing of said flight by coming in contact with a chain link 16. It may be further pointed out that the pivot pins 30 are held in position by means of an integrally forming lock key 36 which extends into a recess formed in the male member of each link 16, which recess may be aligned with similar recesses 38 in the female end of each link 16 only when adjacent links 16 are out of alignment and, for example, are bent to form an angle of substantially 90°. Flight bosses 31 are similarly recessed at 39 to permit free insertion and removal of said pins 30.

It may additionally be pointed out that the head sprocket 14 is preferably provided with flanges 49, 49 adapted to receive the trailing arms 32 as the chain 17 travels around said sprocket 14.

In the operation of the device the motor 18 will drive the conveyer chain 17 through the drive mechanism 19 so that the said chain 17 travels in the direction of the arrow 26. Material to be conveyed is delivered by the hopper 21 through the openings 20 and is conveyed rearwardly a short distance by the return run of the conveyer mechanism until it drops over the double partition seen at 41 formed in the horizontal section where the material is caught by the working run of the conveyer 17 and moved into the opening 24 of the working leg or tube 11. The material is then conveyed along the horizontal portion of said working leg or tube 11 by the flights 23 which are connected at desired intervals to pivot pins 30.

The flights 23 are maintained in a working or material moving position in spite of the influence on them by the material which tends to move them to a non-working or non-conveying position by virtue of the cooperation between the trailing arms 32 and the stationary guide means 34 which in the preferred embodiment are merely interior surfaces of the working leg 11 of casing 10.

During the movement of the material through the vertical or upward portion of the working leg 11, a considerable portion of said material will be carried independently of the scraping action between the flights 23 and the interior surface of said working leg 11, but this scraping action will still take place to some extent. If the conveyer is entirely horizontal no such carrying action will take place. As the material reaches the discharge opening 22 there will be a natural tendency for it to spill out and this will be appreciably enhanced and made substantially complete so as to avoid any appreciable carry-over by virtue of the extension guide means 35 which permits the flights to assume a non-material carrying position. When handling certain material there will be a tendency of the material to cling and not discharge freely from the working faces 25 of the flights 23 after said flights have assumed a discharge or non-conveying position. In such installations a flight wiper or scraper 42 will be positioned in the discharge opening 22 above the point of maximum tilt of flights 23 to scrape the faces thereof and dislodge any adhering material. The scraper 42 is U-shaped, and the outer ends of its arms 43 are hingedly or pivotally fixed to the casing 10 by the pivot pins or bolts 44. The cross piece 45, which is the scraper proper, is fixed to or is integral with the arms 43 and therewith form the U-shaped scraper 42. A stop 46 is fixed to each side of casing 10 and projects inwardly a sufficient distance to limit the pivotal movement of the scraper 42. When the arms 43 of scraper 42 are seated on the stops 46 the cross piece 45 is so positioned as to contact the working faces 25 of flights 23 subsequent to their assuming maximum tilt and as the chain 17 with the flights 23 move upwardly past the scraper 42, the cross piece 45 by virtue of its contact with working faces 25 will drag across said faces dislodging any material thereon. The scraper will be lifted from its stops 46, being rotated on its pivots 44 as each flight 23 moves upwardly past said scraper which will seat itself on said stops after the passing of each flight. It will be understood that the wiper or scraper 42 will be used only when flights 23 are handling material of an adhering nature. The wiper or scraper 42 then serves as a brush to wipe or scrape the adhering material from the upper surface of each flight as it passes the discharging position.

It should be particularly noted that the meting plates 50, 50 are individually adjustable. Two different materials may be introduced into the hopper 21, one on one side of the partition 51 and the other on the opposite side thereof. These materials may then be fed laterally toward each other in desired proportions in accordance with the adjustments of the meting plates 50, 50 and the consequent adjustments of the sizes of the feed openings 20, 20 under the lower edges of these meting plates. The two different materials will drop by gravity over the left-hand ends of the horizontal interior partitions at the position indicated at 41 in Fig. 1 into the horizontal run of the working leg 11. This partition 41 is spaced to the right from the sprocket or wheel 13, as shown in Fig. 1. Mixture of the materials will continue as they are moved by the flights 23 along the working leg 11 and finally the mixture will be discharged from the opening 22.

It should also be noted that the upper surfaces of the ridged roof 49 may be at such angles as to have a definite relation to the angles of repose of the materials received in the two compartments of the hopper. These roof surfaces may be parallel to the inclined bottom surfaces of the two compartments as shown in Fig. 7. It is evident that such arrangement of these surfaces may materially relieve the conveying mechanism of the weights of the materials in the compartments. In other words, the angles of the sloping surfaces on the ridged roof 49 and at the bottoms of the compartments may be sufficiently greater than the angles of repose of the materials to assure flow thereof into the paths of the flights of the conveyer mechanism but the weights of such materials will be largely sustained by such sloping surfaces, thus relieving the weight on the upper surface of the upper partition 41, thereby giving the flights 23 ample freedom of conveying movements. Furthermore, the resulting lateral feeding of material to the return leg 12 of casing 10 prevents material entirely filling the spaces between successive flights 23. This has a very beneficial result in the closed working leg or tube 12 in that there is no packing of material between flights 23. In prior known devices wherein the material completely fills the spaces in the working leg between successive flights, difficulty caused by binding of the compressed material particularly while leaving a curved portion of the casing adjacent an upward stretch, has been encountered. This difficulty has been overcome in the structure providing for the lateral feed, namely the rigged roof 48 so positioned as to insure against a direct downward application of pressure of material in the hopper onto the material in the conveyer, and the lateral feeding of said material thereto.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

In a conveyer, the combination with a casing forming a working leg extending from a horizontal portion around a curve to an upwardly extending portion leading to a discharge opening, of a hopper adjacent said horizontal portion communicating therewith by a feed opening, endless conveyer mechanism adapted to travel through said working leg and including flights mounted on an endless draft chain, a ridged roof in said hopper positioned with its side edges laterally beyond the flights of said conveyer mechanism and thereby protecting said conveyer mechanism against downward pressure of material in said hopper while providing for lateral movement of said material under said roof and through side openings into the path of said flights, and means for adjusting the effective size of each lateral opening and thus adjusting the extent to which the horizontal portion of said working leg is filled between adjacent flights of said conveyer mechanism.

ALEXIS W. LEMMON.